United States Patent [19]
Arai

[11] Patent Number: 4,866,812
[45] Date of Patent: Sep. 19, 1989

[54] WIPERBLADE OF WINDSHIELD WIPER

[75] Inventor: Masaru Arai, Yono, Japan

[73] Assignee: Nippon Wiperblade Co., Ltd., Japan

[21] Appl. No.: 163,110

[22] Filed: Mar. 2, 1988

[30] Foreign Application Priority Data

Mar. 3, 1987 [JP] Japan .................................. 62-46738

[51] Int. Cl.[4] .............................................. B60S 1/40
[52] U.S. Cl. ............................................... 15/250.32
[58] Field of Search .................... 15/250.32–250.42

[56] References Cited

U.S. PATENT DOCUMENTS

| | | | |
|---|---|---|---|
| 3,049,743 | 8/1962 | Graczyk et al. | 15/250.32 |
| 3,576,044 | 4/1971 | Besnard | 15/250.32 |
| 4,180,885 | 1/1980 | Thornton et al. | 15/250.32 |
| 4,290,164 | 9/1981 | Van Den Berg | 15/250.32 |
| 4,308,635 | 1/1982 | Maiocco | 15/250.32 |
| 4,327,458 | 5/1982 | Maiocco | 15/250.32 |
| 4,443,907 | 4/1984 | Chamberlain | 15/250.32 |
| 4,446,589 | 5/1984 | Maiocco | 15/250.32 |
| 4,608,728 | 9/1986 | Sumins et al. | 15/250.32 |

FOREIGN PATENT DOCUMENTS

| | | |
|---|---|---|
| 44399 | 7/1956 | Fed. Rep. of Germany ... 15/250.32 |
| 2584036 | 1/1987 | France ............................. 15/250.32 |
| 31-9766 | 3/1954 | Japan . |
| 39-2010 | 2/1964 | Japan . |
| 58-52853 | 11/1983 | Japan . |
| 1188312 | 4/1970 | United Kingdom . |
| 1192540 | 5/1970 | United Kingdom . |
| 1254109 | 11/1971 | United Kingdom . |
| 2125961 | 3/1984 | United Kingdom . |

*Primary Examiner*—Peter Feldman
*Attorney, Agent, or Firm*—Wenderoth, Lind & Ponack

[57] ABSTRACT

A wiperblade comprising a main yoke having on the longitudinally central portion formed by two side plates spaced apart and parallel, non-circular and aligning through holes formed in the side plates, and a pin having non-circular portions corresponding to the non-circular holes in the side plates, said pin being inserted from the outside of either of the side plates so as to constitute a pivotal connecting portion between the wiperblade and a wiper arm.

4 Claims, 2 Drawing Sheets

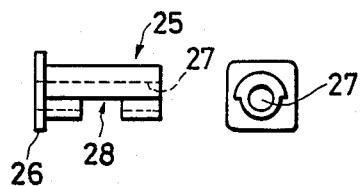
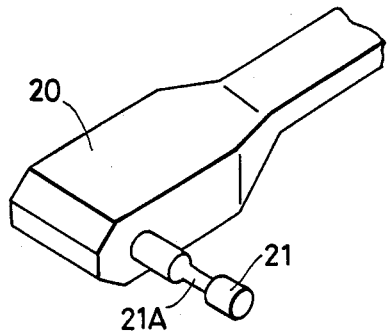
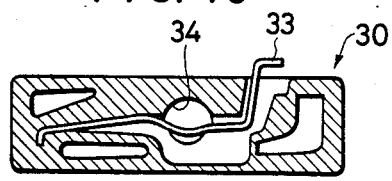
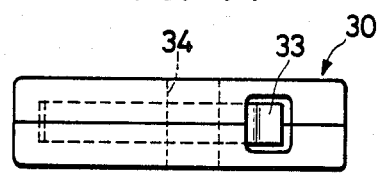
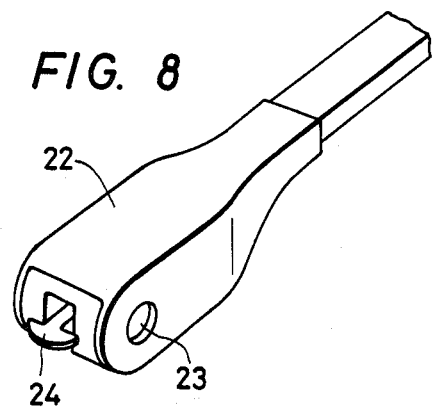
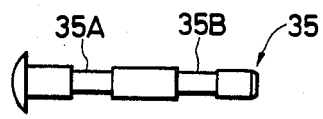
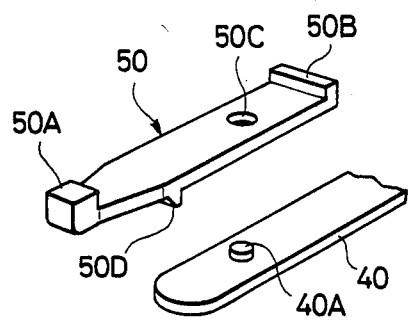
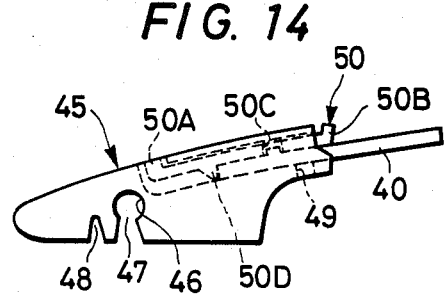

WIPERBLADE OF WINDSHIELD WIPER

FIELD OF THE INVENTION

The present invention relates to a windshield wiper and, particularly to the construction of a connecting portion between a wiper arm and a yoke of a wiperblade of the windshield wiper.

DESCRIPTION OF THE PRIOR ART

Various proposals have been made with respect to the construction of a connecting portion between a wiper arm and a yoke of a wiperblade of the windshield wiper. With respect to the configuration of the tip end portion of the wiper arm, there are (1) a bayonet clip type such as shown in FIG. 13, (2) a side clip A type such as shown in FIG. 7 (3) a side clip B type such as shown in FIG. 8, (4) a U-hook type such as shown in FIG. 2 and the like. These types require specified construction on yokes to which the wiper arms are connected respectively, thus, the type of the wiperblade increases correspondingly.

The present invention has been made in view of the circumstances aforementioned, and aims to provide a wiperblade which can be connected to a wiper arm of various type.

SUMMARY OF THE INVENTION

A wiperblade according to the invention comprises a main yoke having on the longitudinally central portion two spaced apart and parallel side plates, non-circular and aligning through holes formed respectively in the side plates, and a pin having non-circular portions corresponding to the non-circular holes in the side plates. The pin is inserted from the outside of either of the side plates so as to constitute a pivotal connecting portion between the wiperblade and a wiper arm of various type.

According to one embodiment of the invention, the diameter of the pin at the location between the side plates is smaller than the non-circular portions.

A wiper arm of U-hook type can be connected to the wiperblade by providing a connecting member with the outer configuration being adapted to fit on the tip end of the wiper arm and having a bore for rotatably receiving the small diameter portion of the pin, and a cutout extending along the length of the bore for resiliently passing the small diameter portion of the pin into the bore.

The pin may be formed to have a tubular form adapted to receive a pivot pin of a wiper arm of side clip type having a sidewise projecting pivot pin, a cutout is formed in the tubular pin to receive a spring, and a spring retainer is preferably supported by the tubular pin and between the side plates of the wiper arm.

The wiperblade according to the invention having the tubular pin may also be connected to a wiper arm of side clip type and not having sidewise projecting pin. A pin having a pin portion inserted into the tubular pin on one end and another pin portion on the other end which is adapted to be releasably connected the wiper arm.

BRIEF DESCRIPTION OF THE DRAWINGS

Further objects and effects of the invention will become apparent from the following detailed description taken in conjunction with the drawings, in which:

FIG. 7 and FIG. 8 are perspective views of tip end portions of wiper arms of side lock type, respectively;

FIG. 9 shows a side view and an end view of a sleeve for use with the wiper arm of FIG. 7 or FIG. 8;

FIG. 10 and FIG. 11 are a side view and a plan view of a second connecting member, respectively;

FIG. 12 is a side view of a pin for use with the wiper arm of FIG. 8;

FIG. 13 is a perspective view of the tip end portion of a wiper arm of bayont clip type, and FIG. 14 is a side view of a connecting member for use with the wiper arm of FIG. 13.

DETAILED DESCRIPTION OF PREFERRED EMBODIMENTS

Figure 1:
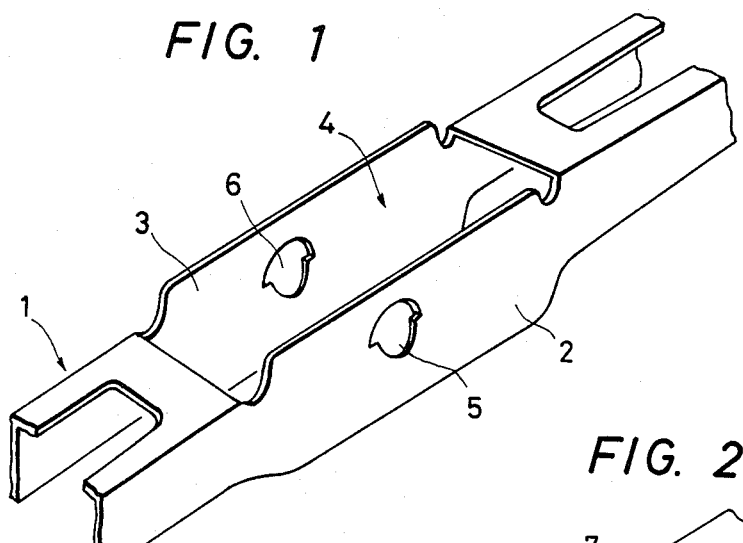
FIG. 1 is a perspective view of the central portion of a wiperblade according to present invention.

FIG. 1 is a perspective view of the longitudinal central portion of a main yoke 1 of the wiperblade of the present invention. The main yoke 1 is formed at the central portion with two spaced and parallel side plates 2 and 3, to define a space 4 being open in upward and downward directions. Non-circular and aligning through holes 5 and 6 are formed respectively in the side plates 2 and 3. In the embodiment, each of the through holes 5 and 6 has a configuration formed by connecting a large diameter half circle and a small diameter half circle, and has an equal size, but the holes 5 and 6 may have any desired configuration and may have different size.

Figure 2:
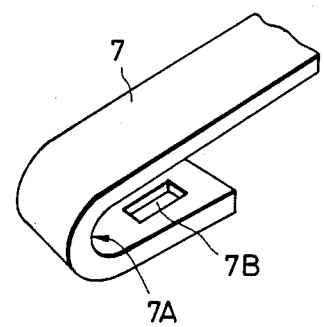
FIG. 2 is a perspective view of the tip portion of a U-hook type wiper arm.
Figure 3:
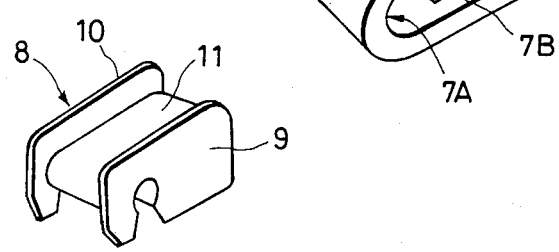
FIG. 3 is a perspective view of a connecting member for use with the wiper arm of FIG. 2.
Figure 5:
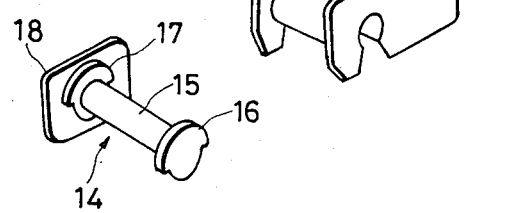
FIG. 5 is a perspective view of a pin.
Figure 4:
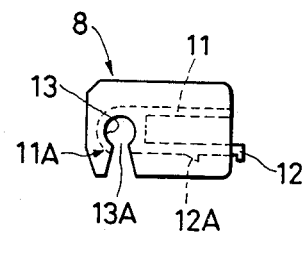
FIG. 4 is a side view of the connecting member of FIG. 3.
Figure 6:
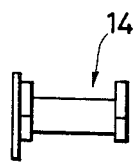
FIG. 6 is a side view of the pin of FIG. 5.

FIG. 3 FIG. 6 show means for connecting a wiper arm of U-hook type as shown in FIG. 2 with the yoke 1 of FIG. 1. The wiper arm 7 of U-hook type as shown in FIG. 2 has on the tip end thereof a curved portion 7A and a retaining opening 7B. A connecting member 8 shown in FIGS. 3 and 4 and a pin 14 shown in FIGS. 5 and 6 are used to connect pivotally the yoke 1 and the wiper arm 7. The connecting member 8 comprises flange portions 9 and 10 on opposite sides, a main body portion 11 being disposed between the flange portions 9 and 10 and having the configuration corresponding to the curved portion 7A of the wiper arm 7, a retaining portion 12 being integrally formed on the lower surface of the main body portion 11 and having a projection or pawl 12A which is resiliently biased downward for engaging with the retaining opening 7B of the wiper arm 7, and a transversely extending bore 13 having a cutout 13A. Preferably, the connecting member 8 is formed integrally of synthetic resin material. The pin 14 comprises a small diameter portion 15 being received rotatably in the bore 13 of the connecting member 8, non-circular portions 16 and 17 corresponding to the holes 5 and 6 in the yoke 1, and a flange 18 provided on one end of the pin 14.

In use, the pin 14 is inserted through the holes 5 and 6, with the flange 18 abutting the outer surface of either one of the side plates 2 and 3. The pin 14 is non-rotatably connected to the yoke 1. Next, the connecting member 8 is mounted on the small diameter portion 15 of the pin 14. By determining suitably the size of the cutout 13A of the bore 13 in the connecting member 8, the material of the connecting member 8, and the rigidity or resiliency of portions 11A adjacent to the cutout 13A (FIG. 4), it is possible to connect the pin 14 with the connecting member 8 snappingly.

As the connecting member 8 prevents the pin 14 from slipping out of the holes 5 and 6, it is not necessary to provide any retaining means such as caulking or the like.

FIG. 7 shows the tip end portion of a wiper arm 20 of side clip A type, and FIG. 8 shows the tip end portion of a wiper arm 22 of side clip B type. The wiper arm 20 has a pin portion 21 projecting in the sidewise direction, and the wiper arm 22 has a bore 23 for receiving a pin and a spring 24 for engaging with a small diameter portion of the pin.

The wiperblade according to the invention can also be connected to the wiper arm 20 or 22 of side clip type shown in FIGS. 7 and 8 by utilizing a sleeve or pin 25 as shown in FIG. 9, a connection member or spring supporting member 30 shown in FIGS. 10 and 11, and a pin 35 shown in FIG. 12. The pin 35 is used only for the wiper arm 22 of the side clip B type. The sleeve 25 shown in FIG. 9 includes a flange 26 on one end, a bore 27 and a cutout portion 28, and the cross sectional configuration of the sleeve 25 corresponds to the non-circular through holes 5 and 6 in the main yoke 1. The spring supporting member 30 shown in FIGS. 10 and 11 is made of two part synthetic resin mouldings, and has an opening 34 corresponding to the through holes 5 and 6 in the main yoke 1, and is mounted in the space 4 by the sleeve 25. A part of the spring 33 is received in the cutout portion 28 of the sleeve 25 so as to prevent the sleeve 25 from escaping out of the through holes 5 and 6, whereby the main yoke 1, the sleeve 25 and the spring supporting member 30 are retained in the assembled condition without providing any particular retaining means.

In connecting the wiper arm 20 of FIG. 7 with the main yoke of FIG. 1, the pin 21 is inserted into the bore 27 of the sleeve 25 and the spring 33 engages with the small diameter portion 21A of the pin 21 to prevent the pin 21 from escaping out of the bore 27. It will be understood that the escaping out of the sleeve 25 from bore 27 is also prevented by the spring 33.

In connecting the wiper arm 22 of FIG. 8 with the main yoke 1, the pin 35 of FIG. 12 is inserted into the bore 27 of the sleeve 25 so that the spring 33 engages with a small diameter portion 35A of the pin 35 to prevent the pin 35 from escaping out of the bore 27 and to prevent the sleeve 25 from escaping out of the holes 5 and 6 in the main yok 1. The pin 35 is inserted into the opening 23 in the wiper arm 22 with the small diameter portion 35B of the pin 35. Thus, the wiper arm 22 is reliably and easily connected with the main yoke 1.

FIG. 13 shows a wiper arm 40 of bayonet clip type. The wiper arm 40 has a projection 40A. FIG. 14 shows a connecting member 45 for use in connecting the main yoke 1 with the wiper arm 40. The member 45 includes an opening 46 for receiving the small diameter portion 15 of the pin 14 of FIG. 5, a cutout portion 47 extending along the length of and communicating with the opening 46 for releasably mounting the pin 14 in the opening 46, another cutout portion 48 for permitting resilient deformation of the cutout portion 47, and a retaining member 50 for releasably mounting the wiper arm 40 on the connecting member 45. The retaining member 50 includes a front end portion 50A which is located in an opening formed in the upper surface of the connecting member 45 at a retaining condition shown in FIG. 14, and is adapted to be pushed downward in removing the wiper arm 40 for permitting the retracting movement of the wiper arm together with the retaining member 50. Further, the retaining member 50 has a rear end portion 50B, an opening 50C for engaging with the projection 40A of the wiper arm 40, and a downward projecting portion 50D. The projecting portion 50D engages with an opening 49 in the lower surface of the connecting member 45 in a released condition. The construction of the retaining member 50 is known per se. The pin 14 acts to mount the connecting member 45 on the yoke 1, and the connecting member 45 acts to prevent the pin 14 from escaping out of the yoke 1.

According to preferred embodiments, the pins 14 and 35, the sleeve 25, and the connecting members 8, 30 and 45 can be formed of synthetic resin mouldings, thereby reducing the cost.

According to the invention, a novel construction of a pivotally supporting portion and of a yoke for connecting with wiper arms of various types.

The wiperblade according to the invention can easily be connected to wiper arms of various types, thus, it is possible to reduce the types of the wiperblade thereby reducing the manufacturing cost.

What is claimed is:

1. A wiperblade holder comprising:
   a main yoke having two spaced opposed parallel side plates defining a longitudinal central portion opening;
   means attached to said wiperblade holder for holding a wiper blade;
   a non-circular through hole in each said parallel side plate of said main yoke, and said non-circular through holes being aligned for receiving a pin therethrough;
   a tubular pin received in said non-circular through holes, said tubular pin having first and second ends, each said first and second ends being non-circular and mating with said non-circular through holes in said side plates, a pivot pin-receiving tube means in said tubular pin for receiving a pivot pin of a windshield wiper arm of the side clip type having a sideways projecting pivot pin, and a reduced diameter portion defined on said tubular pin for engaging a spring retainer; and
   a spring retainer engaging said reduced diameter portion of said tubular pin, said spring retainer being supported on said tubular pin between said two side plates of said main yoke.

2. A wiperblade holder comprising:
   a main yoke having two spaced opposed parallel side plates defining a longitudinal central portion opening;
   means attached to said wiperblade holder for holding a wiper blade;
   a non-circular through hole in each said parallel side plate of said main yoke, and said non-circular through holes being aligned for receiving a pin therethrough;
   a tubular pin received in said non-circular through holes, said tubular having first and second ends, each said first and second ends being non-circular and mating with said non-circular through holes in said side plates, a pivot pin-receiving tube means in said tubular pin for receiving a first subportion of a pivot pin, and a reduced diameter portion defined on said tubular pin for engaging a spring retainer;

a pivot pin, first and second subportions on said pivot pin, said first subportion being received in said pivot pin-receiving tube means in said tubular pin, and a wiper arm receiving means on said second subportion of said pivot pin for receiving a wiper arm of the type having no sideways projecting pivot pin; and a spring retainer engaging said reduced diameter portion of said tubular pivot pin, said spring retainer being supported on said tubular pin between said two side plates of said main yoke.

3. A wiperblade holder comprising:

a main yoke having two spaced opposed parallel side plates defining a longitudinal central portion opening for receiving a U-hook type wiper arm therein;

means attached to said wiperblade holder for holding a wiper blade;

a non-circular through hole in each said parallel side plate of said main yoke, and said non-circular through holes being aligned for receiving a pin therethrough;

a pivot pin received in said non-circular through holes, said pivot pin having first and second ends, and each said first and second ends being non-circular and mating with said non-circular through holes in said side plates; and a connecting member disposed between said parallel side plates of said main yoke, bore means in said connecting member for rotatably and detachably engaging said pivot pin, a U-shaped portion on said connecting member for mating with a U-shaped end of a U-hook type wiper arm, and a retaining portion on said connecting member for detachably engaging a retaining opening of a U-shaped end of a U-hook type wiper arm.

4. A wiperblade holder comprising:

a main yoke having two spaced opposed parallel side plates defining a longitudinal central portion opening;

means attached to said wiperblade holder for holding a wiper blade;

a non-circular through hole in each said parallel side plate of said main yoke, and said non-circular through holes being aligned for receiving a pin therethrough;

a pivot pin received in said non-circular through holes, said pivot pin having first and second ends, and each said first and second ends being non-circular and mating with said non-circular through holes in said side plates;

a connecting member disposed between said parallel side plates of said main yoke, bore means in said connecting member for rotatably and detachably engaging said pivot pin, an elongated slot in said connecting member for mating with a flat end of a bayonet type wiper arm, and an engaging opening in said connecting member for engaging a projection on a retaining member; and a retaining member inserted in said elongated slot of said connecting member for cooperating with said connecting member for retaining a flat end of a bayonet type wiper arm mating in said elongated slot when said retaining member and said connecting member are in an engaged position, and a projection on said retaining member for engaging said engaging opening in said connecting member when said retaining member is in a released position.

* * * * *